United States Patent [19]

Poirier

[11] Patent Number: 4,941,264
[45] Date of Patent: Jul. 17, 1990

[54] DEVICE FOR READING DIRECTLY FROM A CHART THE HEADING TO BE FOLLOWED BY AN AIR OR SEA-GOING VEHICLE

[76] Inventor: Alain Poirier, 16, boulevard Flandrin, 75116 Paris, France

[21] Appl. No.: 316,840

[22] Filed: Feb. 28, 1989

[30] Foreign Application Priority Data

Mar. 1, 1988 [FR] France .................. 88 02527

[51] Int. Cl.⁵ .................. G01C 21/20; B43L 7/06
[52] U.S. Cl. .................. 33/457; 33/431; 33/15 D
[58] Field of Search ............. 33/457, 473, 431, 15 D, 33/456, 663

[56] References Cited

U.S. PATENT DOCUMENTS

| | | | |
|---|---|---|---|
| 1,984,390 | 12/1934 | Wright | 33/431 |
| 2,244,125 | 6/1941 | Siefker | 33/457 |
| 2,334,135 | 11/1943 | Thurston et al. | 33/431 |
| 2,377,905 | 6/1945 | Sadowsky | 33/457 |
| 2,482,424 | 9/1949 | McConnell | 33/431 |
| 3,885,316 | 5/1975 | Casten | 33/663 |
| 4,138,817 | 2/1979 | Frost et al. | 33/431 |
| 4,270,278 | 6/1981 | Metzner | 33/457 |
| 4,283,861 | 8/1981 | Timmis | 33/457 |
| 4,499,665 | 2/1985 | Davis | 33/457 |
| 4,512,087 | 4/1985 | Jerhammar | 33/457 |

*Primary Examiner*—Allan N. Shoap
*Assistant Examiner*—Christopher W. Fulton
*Attorney, Agent, or Firm*—William A. Drucker

[57] ABSTRACT

A device is provided for directly reading from a chart the heading to be followed by an air or sea-going vehicle, comprising a disk with, at its periphery, a circular coaxial graduation of the "compass card" type movable in rotation with respect to this disk, the latter being itself mounted for rotation about a fixed shaft fast with a support, via a rotary mount with offset adjustable in modulus and orientation. The disk further comprises a rectilinear scale for determining the modulus of the offset, as well as a reference mark for indicating the orientation of this offset on the circular graduation. The scale is graduated in successive values representative of the wind (or current) speed/proper speed of the vehicle ratio.

12 Claims, 4 Drawing Sheets

DEVICE FOR READING DIRECTLY FROM A CHART THE HEADING TO BE FOLLOWED BY AN AIR OR SEA-GOING VEHICLE

BACKGROUND OF THE INVENTION

The present invention relates to a device for directly reading from a chart the heading to be followed by an air or sea-going vehicle and the estimated time which this vehicle should take to make a journey between two geographical references, this information being obtained without having to calculate a drift correction and magnetic declination.

It should first of all be noted that the "estimated time" mentioned above is the time actually taken by the vehicle, taking into account phenomena such as wind or sea currents, as opposed to the time without wind or without current.

Furthermore, the "ground course" in air navigation or "bottom course" in sea navigation, is the course covered with respect to the ground (to the sea bottom) and, consequently, on the chart. It is therefore the course which is fixed as objective.

The presence of the wind (or of the current) requires, for following the same course to be covered, a drift correction and a fictitious heading called "true heading", which is the angle formed by the axis of the vehicle with the geographical North. It will be recalled in this connection that the "magnetic heading" is the heading with respect to the magnetic North; it is derived from the "true heading" by addition of the magnetic declination.

The "true heading" is calculated by a vectorial composition of the "wind speed", "vehicle speed" vectors (detected with respect to air or the water), and the "ground speed" or "bottom speed"; this composition is usually called "speed triangle".

These vectors are of sliding types, i.e. their point of application is movable and is therefore not defined.

In an orthonormed system, these vectors are then defined by their arguments (angle formed by a reference direction and the direction of the vector) and their modulus.

Thus:
the "wind speed" vector will have as argument the direction of the wind and, as modulus, the absolute value of the wind speed, these two pieces of information forming data,
the "vehicle speed" vector will have as argument the "true heading" of the vehicle which is unknown and, as modulus, the absolute value of the speed of the vehicle with respect to air (or to the water) which forms a data,
the "ground speed" vector will have as argument the "ground (or bottom) course" which is a data and, as modulus, a value forming an unknown.

This vectorial system comprises then four data and two unknowns.

SUMMARY OF THE INVENTION

The purpose of the invention is then more particularly to provide a device for effecting this vectorial composition, so as to be able to read the true heading directly, while reducing to a strict minimum any manipulation and by suppressing any calculation.

It is based on the realization that it is possible to divide each of the moduli of the vectors of the above vectorial composition, without changing the arguments and that by dividing each of these moduli by the absolute value of the speed of the vehicle, an equivalent vectorial composition can be used in which the vector corresponding to the proper speed is a unitary vector, whereas the modulus of the vector corresponding to the wind speed vector (relative speed vector) is equal to the wind speed/proper speed ratio.

It is clear that, considering that the modulus and value of the relative wind speed, the modulus of the unitary vector (argument, proper speed) and the value of the ground speed are known, it becomes possible to make a geometrical construction of the vectorial composition, from which the true heading of the vehicle may be read directly.

To obtain this result, the device of the invention comprises a disk having at its periphery a rotatable circular coaxial graduation of the compass card type, this disk being itself mounted for rotation about a fixed shaft integral with a support, through a rotary fitting with offset adjustable in modulus and in orientation, said disk further comprising a rectilinear scale for determining the modulus of the offset, as well as a first reference mark for indicating the orientation of this offset on the circular graduation, said scale being graduated in graduations representative of successive values of said wind speed/proper speed of the vehicle ratio.

The use of this device comprises then the following operating phases:
determination of the wind speed/proper speed ratio, for example by means of an abacus;
adjustment of the off-centering of the disk according to the value of the previously obtained ratio, the orientation of this offset being determined by setting the first reference mark on a value of the circular graduation corresponding to the orientation of the wind (meteorological data);
the setting of the zero of the circular graduation on the North; and
reading the true heading which is indicated on the circular graduation by a straight line oriented along the geographical heading and passing through said axis.

Advantageously, said device may further comprise a second reference mark rotatable about the disk, independently of said circular graduation, this pointer being intended to be oriented along the geographical North, thus, during the phase of setting the circular graduation, the operator may, in a first stage, set this pointer along the geographical North then, in a second stage, rotate the circular graduation so as to obtain, between the zero of this graduation and the pointer, an angular deviation corresponding to the magnetic declination. The true heading, read from the device, will have the magnetic North as reference.

Furthermore, the support may itself comprise means for aligning it with the geographical heading and means for indicating the true heading on the circular graduation, once said alignment has been made.

BRIEF DESCRIPTION OF THE DRAWINGS

Embodiments of the invention will be described hereafter by way of non limitative examples, with reference to the accompanying drawings in which.

DESCRIPTION OF THE PREFERRED EMBODIMENTS

Figure 1:
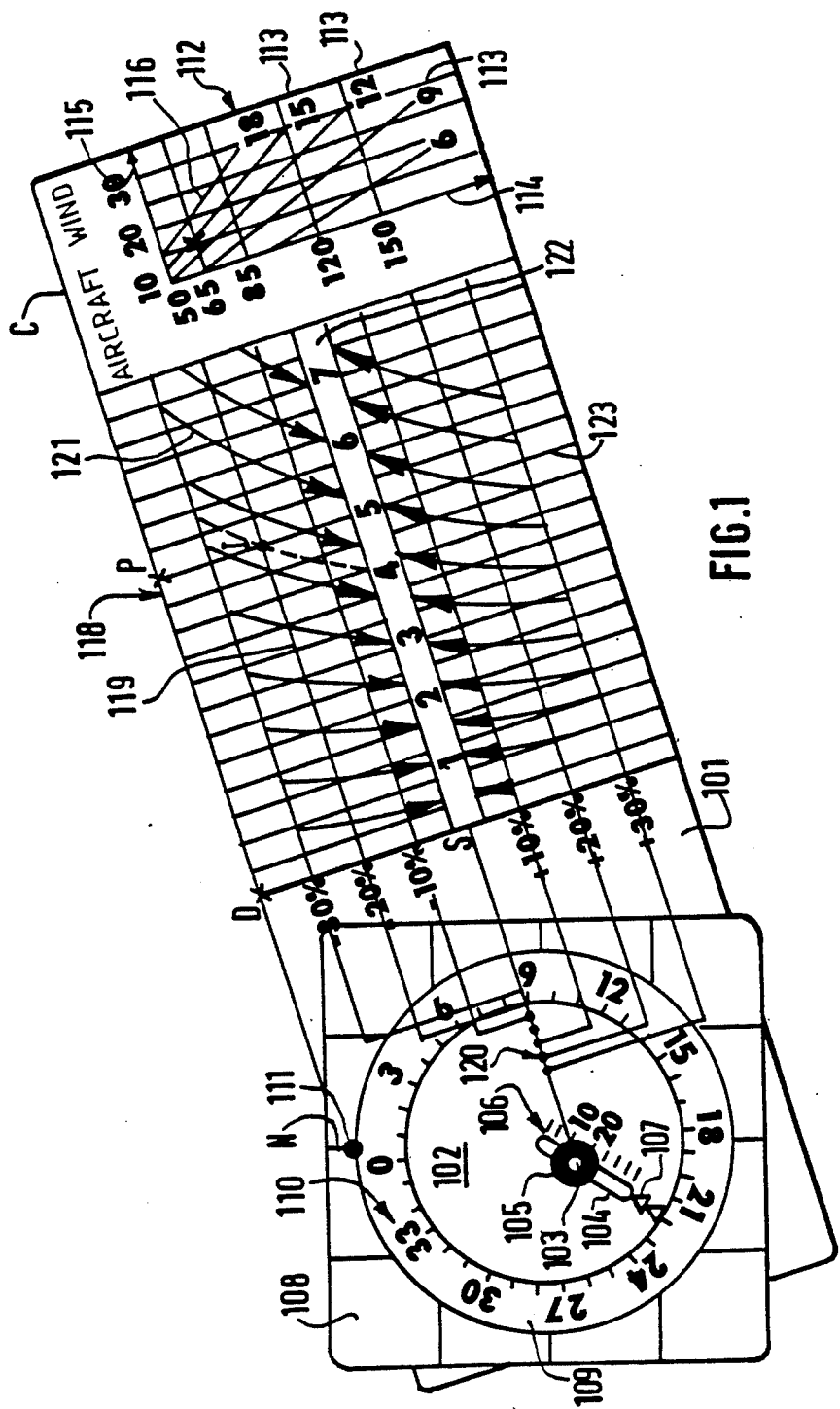
FIG. 1 shows, in a top view, a first embodiment of a device according to the invention for reading the heading to be followed by an aerodyne.

Such as shown in FIG. 1, the device is formed first of all of a flat support 101, of rectangular shape, made from a flexible transparent material, dulled on its upper face so as to be able to write on it with a pencil and rub out with a rubber.

On this support 101 a disk 102, also made from a transparent material, is mounted for rotation with adjustable off-centering.

This rotary mounting comprises more particularly a shaft 103 passing through a bore formed in the support and a radial recess 104, of oblong shape, made in disk 102 substantially from the center of this disk 102 as far as its periphery. This mounting further comprises a locking device 105 associated with shaft 103, so as to be able to hold disk 102 in the chosen position with off-centering whose absolute value is located by means of a scale 106 associated with the recess 104, and whose orientation is defined by means of a reference mark 107 situated at the periphery of disk 102.

Moreover, on the periphery of disk 102 two transparent concentric rings 108, 109 are mounted for rotation, having the same internal diameter and which are superimposed and movable with respect to each other with a tight fit.

Ring 108 has an external periphery of square shape and comprises cross lining with indication of the geographical North N, for its orientation on the chart.

Ring 109, which has a circular external periphery, of a diameter less than the side of said square shape, comprises a compass card 110 graduated in this example from 0 to 360.

A locking system 111 makes it possible to secure the two rings 108, 109 together in a relative desired angular position (in practice, this relative angular position corresponds to the magnetic declination).

Figure 2:
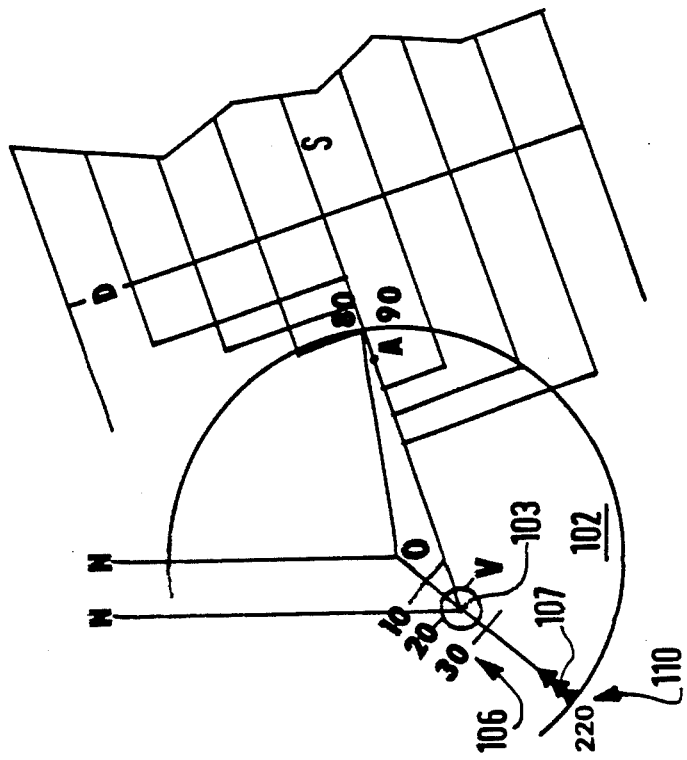
FIG. 2 is a schematic representation bringing out the vectorial composition from which the true heading is determined in the device of FIG. 1.

Such as it is shown in FIG. 2, the operation of the above described device is then the following :

In FIG. 2, the segment OV between the center 0 of disk 102 and shaft 103 forms in fact the relative speed vector. Its modulus is in fact the off-centering of disk 102 and is determined by the wind speed/proper speed ratio. For this, the invention proposes using, for making this determination, an abacus 112 drawn on the support which delivers a guide number 113 corresponding to each of the values of this ratio. Concurrently, scale 106 associated with the oblong recess 104 will be graduated in guide numbers 113.

More precisely, this abacus comprises as ordinates (axis 114) the proper speeds of the vehicle, as abscissa (axis 115) the wind speeds as well as a series of curves 116 joining together the points corresponding to the same wind speed/proper speed ratio, each of these curves 116 having associated therewith a guide number 113 corresponding to the product of the basic factor multiplied by the wind speed expressed in knots.

It should be stated in this connection that the values of the speeds shown as ordinates and as abscissa are expressed in usual units, e.g. as a basic factor (time taken to cover a nautical mile), in knots or kilometer/hour.

The orientation of segment OV corresponds to the orientation of the wind (angle NOV=bearing of the wind). It is adjusted by rotating disk 102 until its pointer 107 reaches the desired value indicated on the graduation of the compass card 110.

The segment OA forms said unitary vector (corresponding to the proper speed). Its modulus is chosen equal to the radius of disk 102, whereas its orientation forms an unknown.

Seqment AV represents the ground speed vector whose modulus forms an unknown and whose orientation corresponds to the geographical heading plotted on the chart.

The true heading of the vehicle is then obtained, after the triangle OAV has been constructed, by reading the angle NOA, ON materializing the direction of the North (it may consist of the geographical North, corrected by the magnetic declination).

It should be noted that support 101 further carries a second abacus 118 comprising a series of lines 119 parallel to the large side of support 101, these lines 119 each corresponding to a correction ratio of the flight time (indicated as percentages); each line 119 is joined to a reference mark 120 on axis VS which corresponds to an intersection of the compass card 110 with VS (VS being a straight line drawn on support 101 which passes through shaft 103 and is parallel to the large side C of the support). This abacus 118 further comprises a series of curves 121 connecting together the points corresponding to the same flight time.

On the median axis of the abacus, corresponding to the estimated time without wind, a movable rule 122 is provided graduated in flight time. This rule 122 forms part of a set of rules in which each of the rules is graduated for a given proper speed and chart scale.

The use of the above described device is then the following:

- the operator first of all places the correct rule 122, then sets the magnetic declination by appropriate relative rotation of the two rings 108, 109, then locks this setting by means of the locking system 111;
- the operator then determines the guide number 113 by means of abacus 112, then adjusts the offset of disk 102 by bringing shaft 103 in line with the graduation of scale 106 corresponding to this guide number, the orientation of the offset being adjusted by means of reference mark 107 which is placed in line with the graduation of the compass card 110 which corresponds to the wind bearing; at this stage, the device is ready for reading any course. For this:
- the operator places the support 101 on the chart, so that reference mark D coincides with the starting point, and so that the point to be reached P is on the same large side, then
- the operator orientates ring 108 with the cross-ruling along the geographical North (while at the same time rotating ring 109 which is fast therewith).

The heading to be followed may then be read from the circular graduation (at its intersection with the straight line VS).

To read the flight time, the intersection is taken of the vertical line 123 of abacus 118 passing through the point to be reached P with the line 119 of the correction ratio defined by the intersection of the edge of disk 102 on the axis VS, then from the curve passing through this point I (or by extrapolation) the figure (4) indicated on the rule 122 is read out.

Figure 3:
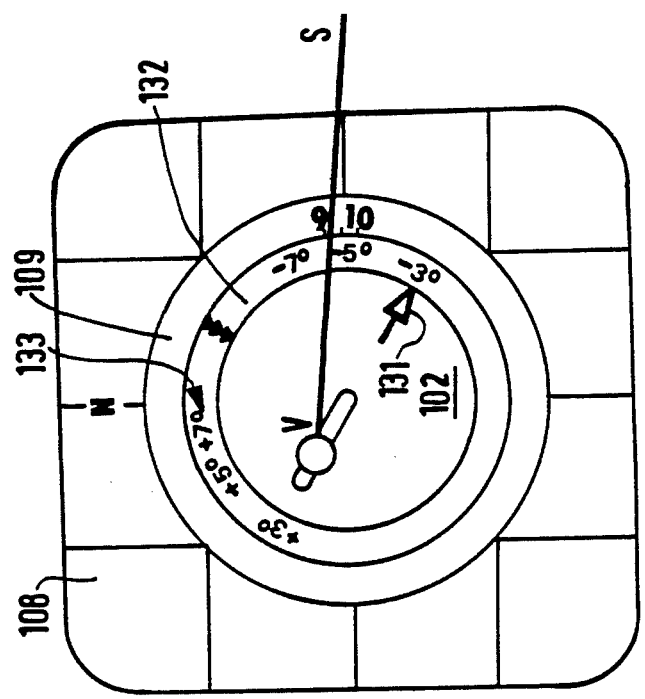
FIG. 3 shows adaptations to be made to the device of FIG. 1, in the case of a sea-going vehicle.

In the variant shown in FIG. 3, which is intended for sea navigation, the pointer 131, defining the orientation of the offset of disk 102, serves for setting the direction in which the current is flowing and not the wind bearing. Furthermore, the device comprises an additional ring 132, concentric with disk 102, and rotatable with a tight fit. It carries the heading correction indications 133 depending on the wind bearing, noted by the user as a function of the characteristics of his ship, on its upper surface which is dulled for this purpose.

Figure 4:
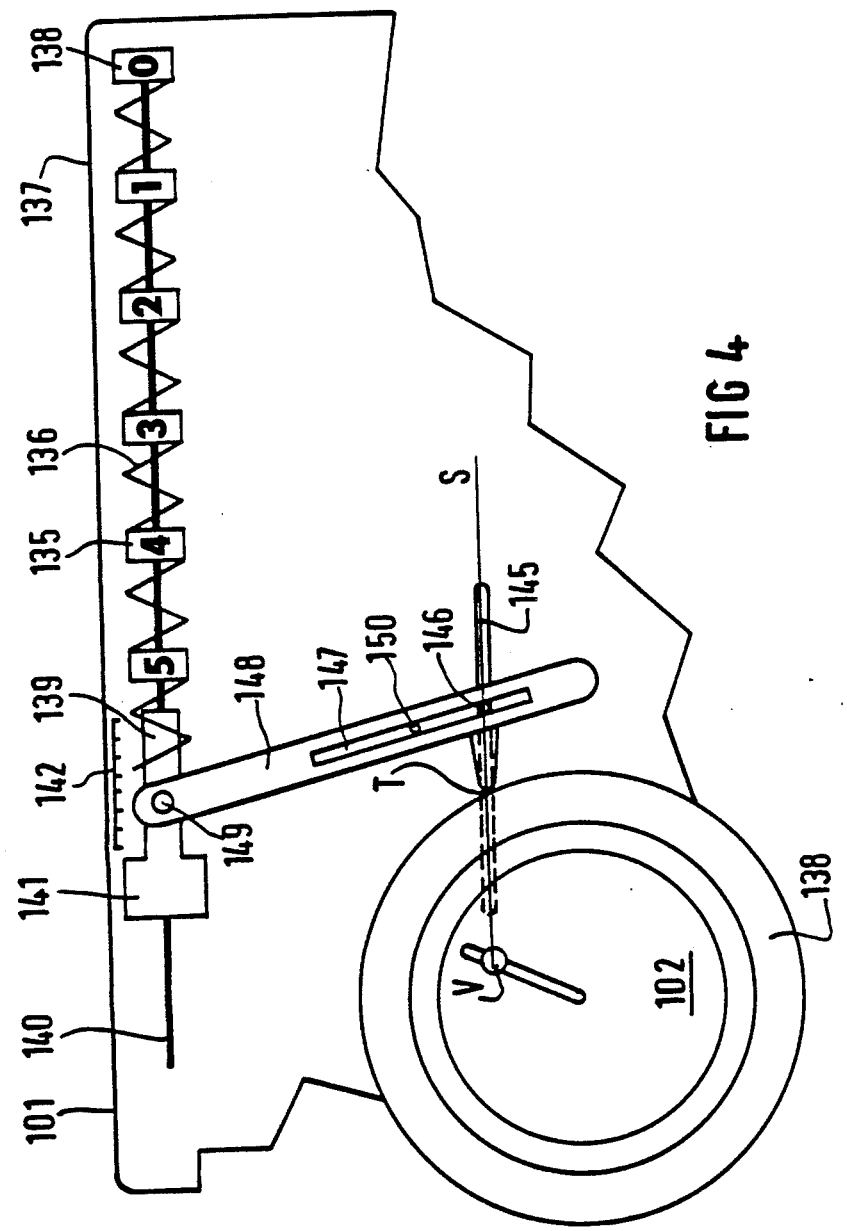
FIG. 4 is a variant of the device shown in FIG. 1, which uses another method of determining the estimated time.

FIG. 4 illustrates another variant of the device of the invention, which uses a system for reading the estimated time using neither rule 122 nor abacus 118.

In this example, the estimated time is read from a variable time scale formed by a series of marks 135 fixed to a spring 136 extending parallel to a large side 137 of support 101 and one bearing point of which is movable. The position of this bearing point is variable as a function of the position along axis VS of the periphery (intersection T) of the cross-ruled ring 138 which has a circular periphery, which position itself depends on the ground speed/proper speed of the vehicle ratio (because of the off-centering of disk 102).

More precisely, marks 135 comprise time indications and are fixed to spring 136 at evenly spaced apart positions. One of the ends 138 of spring 136 is fixed to support 101, whereas the other end is fixed to a slider 139 movable along a rectilinear guide 140 secured to support 101. An adjusting device 141 incorporated in slider 139 permits adjustment of the position of slider 139 along guide 140 and, consequently, makes it possible to define the initial spacing of marks 135. A scale 142 associates each position of slider 139 with a time, taking into account the proper speed of the vehicle and the scale of the chart.

Marks 135 comprise several series of figures, the selection of the adequate series being made for example by rotating a transparent shaped member with internal polyhedral section, in which marks 135 slide which then have external shapes of complementary section.

This device further comprises a coupling system joining the position of slider 139 to the position of the intersection point T of the periphery of ring 138 and of axis VS.

In the example shown, this coupling system includes an oblong slot 145 which extends along axis VS and through which a shaft 146 passes.

This shaft 146 also passes through a longitudinal slit 147 of a lever 148, one end 149 of which is hinged to slider 139.

Through slit 147 also passes a shaft 150 fast with support 101.

Shaft 146 is intended to be applied to the periphery of ring 138, because of the resilience of spring 136.

Thus, a variation of the position of the intersection point T of the periphery of ring 138 with the axis VS (materialized by the slot 145) will cause the lever 148 to pivot. This pivoting will then cause movement of slider 139 which will modify the relative position of marks 135.

Of course, the invention is not limited to this method of coupling, since it would be possible to provide a system adapted for causing a translational movement of slider 139 proportionally to the position variations of the intersection point T, e.g. by means of a system of pinions or a large pitch screw.

It should be noted that the situation of the fixed en of spring 136 (mark 0) which corresponds to the reference mark D, as well as the side for reading the heading along axis VS, depend on the type of spring 136 and on the coupling device used.

Figure 5:
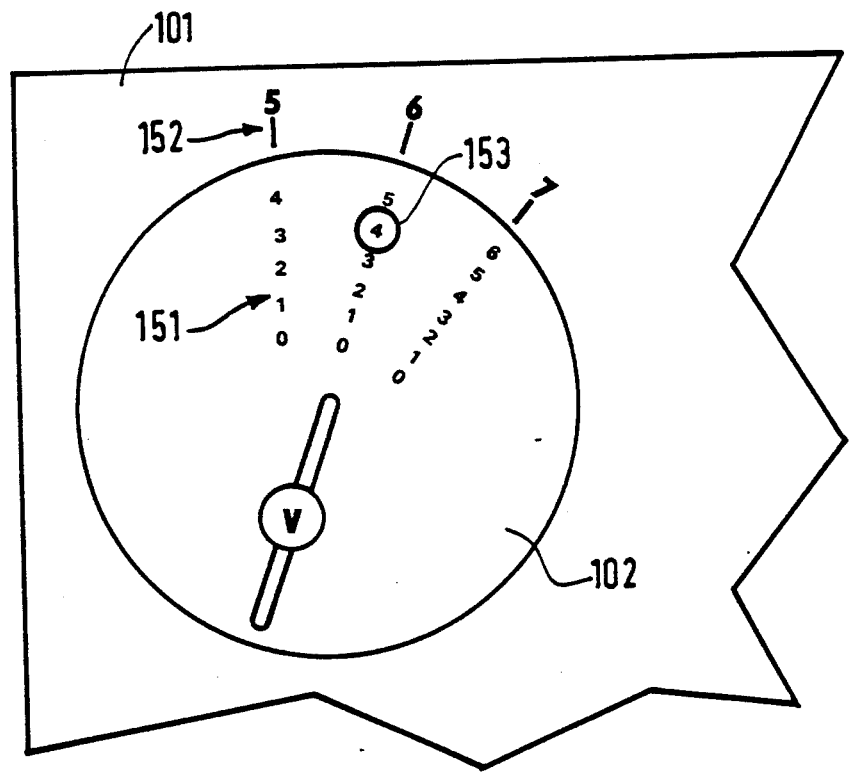
FIG. 5 illustrates a variant of the method of off-centering the disk, usable in a device such as that shown in FIG. 1.

FIG. 5 illustrates a variant of construction of the device of the invention, in which adjustment of the offset of disk 102 may be made directly without having to clarify the wind (or current) speed ratio.

This device includes a family of scales 151 carried on support 101 (or on a support fast with the excentric) under disk 102, each scale being identified by a proper speed of the vehicle (FIGS. 152). Each scale 151 comprises marks indicating the speed of the wind or of the current. Adjustment of the excentricity may then be provided by bringing a reference mark 153 formed on disk 102 in line with the mark corresponding to the proper speed and to the speed of the wind (or the current).

It is clear from the above description that the invention considerably simplifies air or sea navigation, as well as the readings, shaft 103 then being placed in the center of disk 102.

What is claimed is:

1. A device for directly reading from a chart the heading to be followed by an air or sea-going vehicle, comprising a disk having at its periphery a rotatable circular coaxial graduation of the "compass card" type rotatable with respect to the disk so as to be able to be oriented with respect to the North, this disk being itself mounted for rotation about a fixed shaft integral with a support, through a rotary fitting with offset adjustable in modulus as a function of a value representative of the wind or current speed/proper speed of the vehicle ratio and in orientation along the direction of the wind or of the current, said disk further comprising at least one scale for determining the modulus of the offset, as well as a first reference mark for indicating the orientation of this offset on the circular graduation, said scale being graduated in successive values representative of said wind or current speed/proper speed of the vehicle ratio, the heading to be followed being indicated on the circular graduation by a straight line oriented along the geographical heading or course and passing through said axis, wherein said support comprises a rectilinear edge adapted for alignment with a geographical heading plotted on the chart, an axis (VS) parallel to said edge and passing through said fixed shaft, and means for reading the flight or navigation time as a function of a distance between two points on the chart, the proper speed of the vehicle, the scale of the chart and a correction ratio of the flight or navigation time, said axis forming with an edge of said disk an intersection point having a position which determines said correction ratio.

2. The device as claimed in claim 1, comprising first means for locking said disk on its support.

3. The device as claimed in claim 1, comprising, opposite the circular graduation, a pointer movable in rotation about the disk, independently of said circular graduation, said pointer being set to the geographical North.

4. The device as claimed in claim 3, comprising second means for locking the relative position of the circular graduation and of said pointer, with an angular deviation which may correspond to the magnetic declination.

5. The device as claimed in claim 3, wherein said circular graduation and said pointer are carried by two respective rings disposed one on the other coaxially to the disk, and mounted for rotation at the periphery of said disk.

6. The device as claimed in claim 1, wherein said abacus comprises a first series of lines parallel to the axis (VS) which each correspond to a correction ratio of the flight or navigation time, each line being joined to a reference mark which corresponds to an intersection of the axis (VS) and of the edge of the disk, a second series of parallel lines intersecting those of the first series and which corresponds to distances, a series of curves joining together the points corresponding to the same flight or navigation time, and a removable rule graduated in flight or navigation time, this rule forming part of a set of rules in which each of the rules is graduated for a given proper speed and chart scale.

7. The device as claimed in claim 1, wherein, in the case where it is applied to sea navigation, the reference mark defining the orientation of the offset of said disk serves for setting the direction in which the current flows, and further comprises an additional ring, concentric with said disk and movable in rotation, this additional ring carrying heading correction indications depending on the bearing of the wind.

8. The device as claimed in claim 1, wherein the said reading means comprise a variable time scale formed by a series of marks fixed to a spring extending parallel to a large side of the support and a bearing point of which is movable and varies as a function of the position along the axis (VS) of an edge of said disk.

9. The device as claimed in claim 12, comprising a slider movable along a rectilinear guide fast with the support, this slider forming the movable bearing point for the spring and a coupling system joining the position of the slider to the position of the intersection point of said edge of the disk and of said axis (VS).

10. The device as claimed in claim 9, wherein said coupling system comprises an oblong slot which extends along the axis (VS) and through which passes a shaft which also passes through a longitudinal slit of a lever one end of which is hinged to the slider, and through this slit there further passes a shaft fast with the support.

11. The device as claimed in claim 1, wherein adjustment of the offset of the disk includes a family of scales carried by the support or fast with the offset, each scale being identified by a proper speed of the vehicle and comprising marks indicating the speed of the wind or the current, and said adjustment is obtained by bringing a reference mark in line with the mark corresponding to the proper speed and to the speed of the wind (or of the current).

12. The device as claimed in claim 1, wherein said reading means comprises an abacus for reading the flight or navigation time, said intersection point having a position which determines on said abacus said correction ratio.

* * * * *